United States Patent
Sharp (10) Patent No.: US 8,800,755 B2
(45) Date of Patent: Aug. 12, 2014

(54) BELT ALIGNMENT SYSTEM WITH ROTATABLE BUSHING

(76) Inventor: David A. Sharp, Timmins (CA)

( * ) Notice: Subject to any disclaimer, the term of this patent is extended or adjusted under 35 U.S.C. 154(b) by 57 days.

(21) Appl. No.: 13/602,223

(22) Filed: Sep. 3, 2012

(65) Prior Publication Data

US 2013/0233680 A1     Sep. 12, 2013

Related U.S. Application Data

(60) Provisional application No. 61/530,949, filed on Sep. 3, 2011.

(51) Int. Cl.
*B65G 39/16* (2006.01)
*B65G 21/20* (2006.01)

(52) U.S. Cl.
USPC ............ 198/806; 198/808; 198/813; 198/840

(58) Field of Classification Search
USPC ......... 198/802, 804, 806, 808, 813, 818, 823, 198/824, 825, 840, 861.1
See application file for complete search history.

(56) References Cited

U.S. PATENT DOCUMENTS

| | | |
|---|---|---|
| 2,132,052 A | 10/1938 | Sollenberger |
| 2,132,053 A | 10/1938 | Sollenberger et al. |
| 3,056,578 A | 10/1962 | Auger |
| 3,066,547 A | 12/1962 | Evans et al. |
| 3,187,881 A | 6/1965 | Clark |
| 3,368,665 A | 2/1968 | Jinkins |
| 3,777,878 A | 12/1973 | Morrison |
| 3,946,619 A | 3/1976 | Needles et al. |
| 4,072,611 A | 2/1978 | Davis |
| 4,092,914 A | 6/1978 | Burrough et al. |
| 4,231,161 A | 11/1980 | Belfiore |
| 4,527,440 A | 7/1985 | Heitman et al. |
| 4,544,061 A * | 10/1985 | Crandall ................ 198/813 |
| 4,693,363 A | 9/1987 | Kuehnert |
| 4,765,455 A | 8/1988 | Matsuno et al. |
| 5,117,969 A | 6/1992 | Roth |
| 6,131,726 A | 10/2000 | Hovsto et al. |
| 6,520,717 B1 | 2/2003 | Otto et al. |
| 6,634,490 B2 | 10/2003 | Fischer et al. |
| 7,051,867 B2 | 5/2006 | Sharp |
| 8,376,127 B2* | 2/2013 | Sharp ..................... 198/806 |
| 2004/0079621 A1 | 4/2004 | Mott |
| 2011/0272250 A1* | 11/2011 | DeVries .................. 198/617 |

* cited by examiner

*Primary Examiner* — Leslie A Nicholson, III
(74) *Attorney, Agent, or Firm* — Greer, Burns & Crain, Ltd.

(57) ABSTRACT

A conveyor alignment system including pivoting members that support tracking rollers at corresponding shaft ends. Each shaft end being pivotally and non-rotatably attached to corresponding pivoting members by a rotating bushing mounted in a corresponding one of the pivoting members. A guide control bar is pivotally connected at each end to a corresponding torque arm, where the bar includes guide rollers positioned at both edges of the conveyor belt for lateral control of the belt. A spacer is mounted to the support bracket and has a designated height. The spacer deflects the support bracket by the height so that a first end of the shaft is closer to the a first side of the belt than an opposing, second end of the shaft to increase the tension of the rollers on the first side of the belt and reduce the tension of the rollers on another side of the belt.

10 Claims, 7 Drawing Sheets

BELT ALIGNMENT SYSTEM WITH ROTATABLE BUSHING

PRIORITY CLAIM

This application is non-provisional application of and claims the benefit of U.S. Provisional Application No. 61/530,949 filed on Sep. 3, 2011.

BACKGROUND

The present invention relates to the operation of conveyor belts, such as those known as endless belts supported by a series of parallel support rollers, and more particularly to a system for maintaining alignment of a conveyor belt during operation.

Belt tracking is a problem in any industry that uses conveyor belts. It is often not a major problem but rather a maintenance nuisance that progressively over time becomes a major cost.

Several factors can affect belt tracking. Misalignment of the rollers will cause corresponding belt tracking problems. Also, uneven loading of conveyor belts may also cause tracking problems, as well as unequal driving forces across the belt width.

Further, it is common for a tracking device for conveyor belts to fail prematurely. Carry back material (material that has not been removed by a belt scraper at the conveyor discharge point) for instance may cause material build up and result in the rollers and pivot mechanism to seize into a misalignment position.

Various conveyor belt systems have been developed over the years with design considerations relating to accurate tracking. Within any belt the ability to track will vary considerably, and this in turn is due to a number of variables involved in the production of a belt itself. Compounding this problem is the possibility that the belt might be stretched upon installation. Over correction during initial tracking adjustments may result in stretching the belt in inappropriate areas. It has also been observed that existing tracking devices will only align a conveyor belt once it is way off center, thereby resulting in serious damage and down time.

In U.S. Pat. No. 7,051,867, which is incorporated by reference, a suitable belt alignment system includes a pair of pivoting members, each mounted on a corresponding support bracket. Each pivoting member is configured for supporting one of a pair of tracking rollers at a corresponding tracking roller shaft end. Each shaft end is pivotally and non-rotatably attached to a corresponding pivot member by a ball bushing mounted in a corresponding one of the pivot members.

In some applications, it has been found that the configuration of the ball bushing has a relatively limited travel distance that impedes the required range of adjustment for proper conveyor belt alignment. At travel limits of the conventional bushings, the bushings actually "bottom out" before the required degree of alignment movement is achieved. Thus, in some cases, the bushing configuration has become a limiting factor in the effectiveness of the conveyor belt alignment system. It has also been found that conventional ball bushings are prone to corrosion.

SUMMARY OF THE INVENTION

The present belt alignment system addresses the disadvantages of the prior art by providing an improved system featuring a rotatable bushing. In the preferred embodiment an "Oil-Lite" bushing is provided, which is mounted in a block that rotates axially relative to a bushing housing in each pivoting member. The bushing receives a corresponding shaft end of the tracking roller shaft. Suitable lubrication fittings are preferably provided on the housing for lubrication of the bushing. It has been found that the rotatable block in which the bushing is mounted provides a greater range of rotation compared to prior art units.

More specifically, an alignment system for a conveyor having a conveyor belt trained over rollers on a conveyor frame is provided and includes pivoting members each mounted on a corresponding support bracket, the pivoting members configured for supporting tracking rollers at corresponding tracking roller shaft ends, each shaft end pivotally and non-rotatably attached to corresponding pivoting members by a rotating bushing mounted in a corresponding pivoting member. A guide control bar has two ends and is pivotally connected at each end to a corresponding torque arm connected to the corresponding pivoting member. The bar includes guide rollers positioned at both edges of the conveyor belt for lateral control of the belt.

In another embodiment, a pivoting member is provided for use in a conveyor belt alignment system for a conveyor having a conveyor belt trained over rollers on a conveyor frame, the system having two such pivoting members, the pivoting members being configured for supporting tracking rollers at corresponding tracking roller shaft ends. Each pivoting member includes a bushing housing defining a bushing chamber, a bushing block pivotally mounted in said bushing chamber for free rotation about a vertical axis, the bushing block defining a bore, a bushing member fixed in the bore of the bushing block and configured for accommodating one of the tracking shaft ends for pivoting action relative to the bushing housing.

In still another embodiment, an alignment system for a conveyor having a conveyor belt trained over rollers on a conveyor frame is provided, including pivoting members each mounted on a corresponding support bracket, the pivoting members configured for supporting tracking rollers at corresponding tracking roller shaft ends, each shaft end pivotally and non-rotatably attached to corresponding pivoting members by a rotating bushing mounted in a corresponding pivoting member, and a guide control bar having two ends extending laterally outside of the conveyor frame and being pivotally connected at each end to a corresponding torque arm that is located laterally outside of conveyor frame and connected to said corresponding pivoting member. The bar includes guide rollers, each adjustably positioned in a corresponding aperture on ends of the guide control bar for lateral control of the belt. Each pivoting member is pivotable about an axis transverse to a longitudinal axis defined by the tracking roller shaft.

Another embodiment of the conveyor alignment system includes pivoting members each mounted on a corresponding support bracket. The pivoting members configured for supporting tracking rollers at corresponding tracking roller shaft ends. Each end of the shaft being pivotally and non-rotatably attached to corresponding pivoting members by a rotating bushing mounted in a corresponding one of each of the pivoting members. A guide control bar having two ends and being pivotally connected at each the end to a corresponding torque arm connected to the corresponding pivoting member, where the bar includes guide rollers positioned at both edges of the conveyor belt for lateral control of the belt. A spacer mounted to the support bracket. The spacer having a designated height and deflecting the support bracket by the height so that a first end of the shaft is closer to the a first side of the belt than an opposing, second end of the shaft to increase the tension of the rollers on the first side of the belt and reduce the tension of the rollers on another side of the belt.

DETAILED DESCRIPTION OF THE INVENTION

Figure 1:
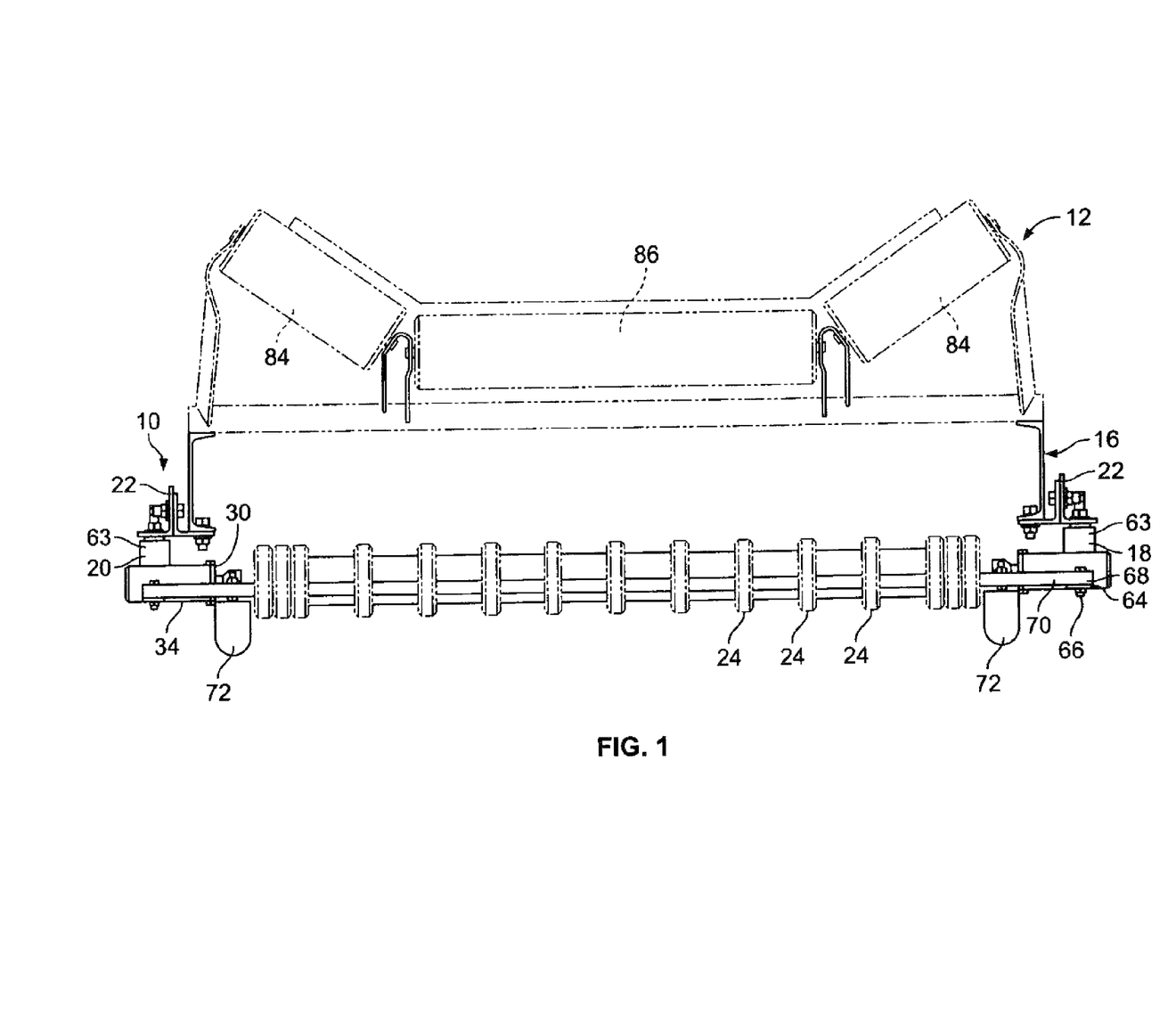
FIG. 1 is a front view of a conveyor belt equipped with the present belt alignment system.
Figure 2:
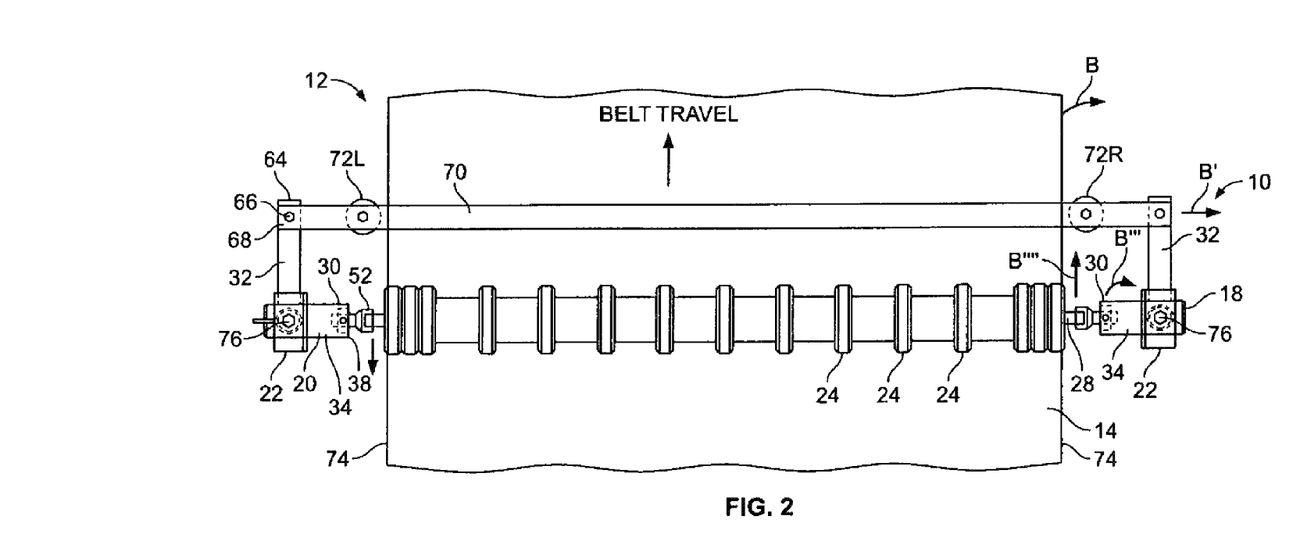
FIG. 2 is a top view of the conveyor belt of FIG. 1.
Figure 3:
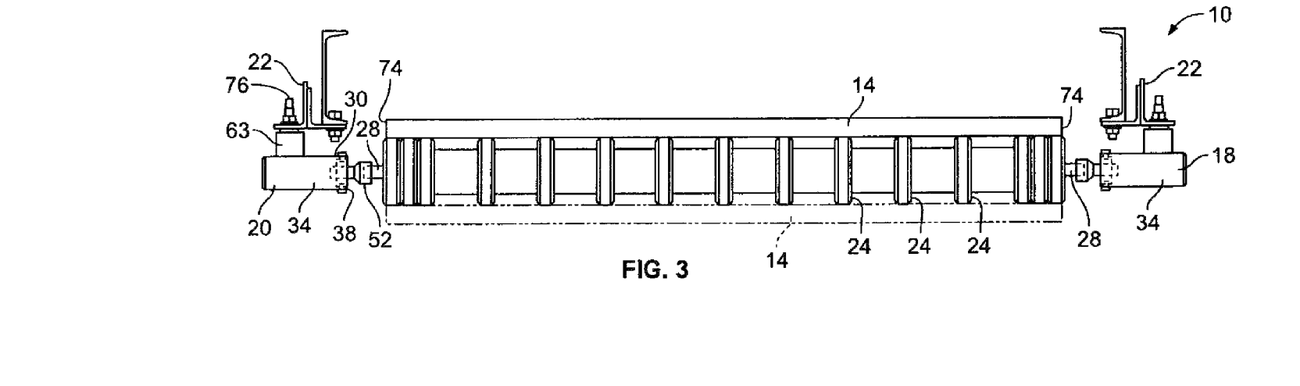
FIG. 3 is a rear view of the belt alignment system of FIG. 1.
Figure 4:
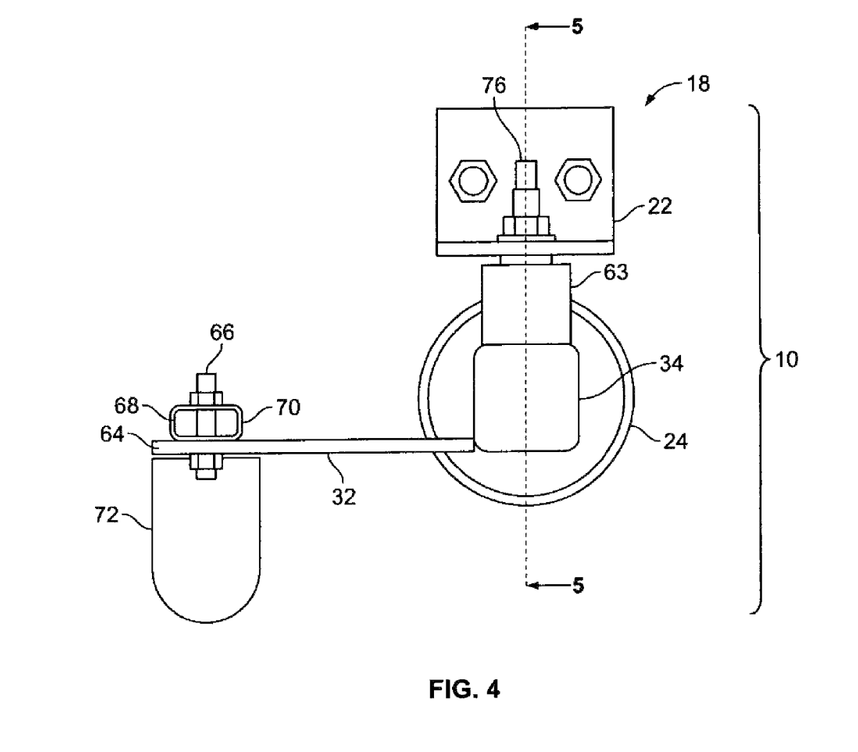
FIG. 4 is an end view of the present belt alignment system.

Referring to FIGS. 1 and 2, the present conveyor belt alignment system, generally designated 10, is intended for use in combination with a conveyor, generally designated 12 of the type having an elongated flexible endless belt 14 trained over a head roller and a tail roller (not shown), the head roller being rotatably powered by a conveyor drive. A typical conveyor 12 will include a relatively rigid conveyor frame 16 holding the rollers in substantially parallel orientation for rotation about parallel rotational axes. The conveyor belt 14 is trained about the head and tail rollers, thereby forming a working or troughing flight and a return flight. It is noted that the width and length of the belt 14 may vary. Also it is contemplated that the belt 14 may be planar or flat, as well as cupped to retain particulate matter, particularly on the troughing flight as seen in phantom in FIGS. 1 and 9. The present system 10 may be mounted either on flat or cupped portions of the belt 14.

Figure 9:
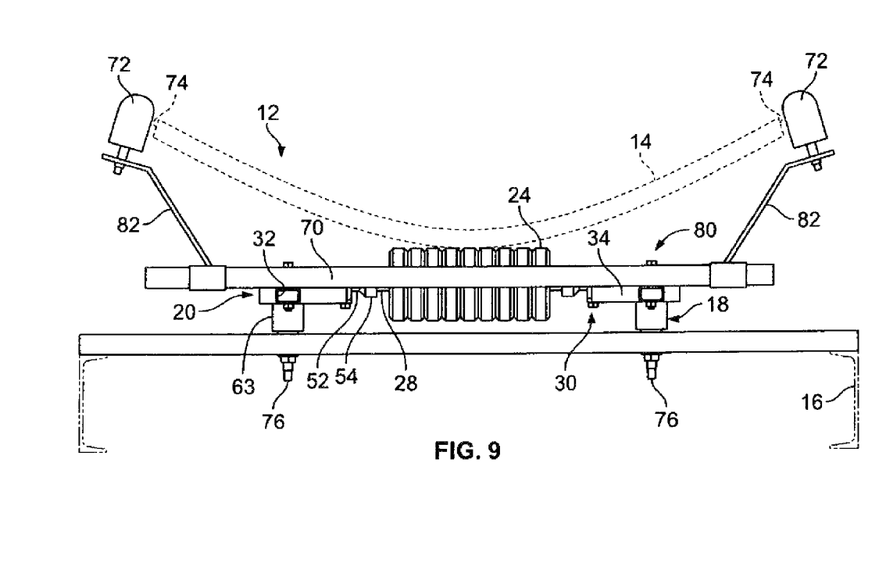
FIG. 9 is a front elevation of the system of FIG. 8.

The present alignment system 10 includes two pivoting members 18, 20 which are preferably mounted on a support bracket 22 on either the working flight side or the return flight side of the conveyor belt 14. It is noted that numerous such support brackets 22 can be used, depending on the overall length of the conveyor belt 14. It is also contemplated as seen in FIG. 9, that the support brackets 22 are eliminated.

The alignment system 10 further includes castellated tracking rollers 24 mounted on a shaft 26 (FIG. 5) having a pair of shaft ends 28. It is noted that the shaft 26 need not extend continuously through the corresponding roller 24 but may be provided in shaft segments, that the rollers 24 could also be regular steel or rubber lagged rollers, with the latter preferred, and that they do not have to be castellated in all instances. Each shaft end 28 is accommodated in a rotating bushing 30.

More specifically, and referring to FIGS. 2-7, each pivoting member 18, is generally "L"-shaped, including a torque arm 32 fixed normally adjacent to an end of a bushing housing 34. Each torque arm 32 is located laterally outside of the conveyor frame 16 and is connected to a corresponding pivoting member 18, 20. The bushing housing 34 is preferably polygonal and the shape may vary, but in the preferred embodiment is square in cross-section (FIGS. 6 and 7), and defines a bushing chamber 36. While other materials are contemplated, the preferred bushing housing 34 is 3 inch square HSS tubing. It is contemplated that the size of the tubing will vary with belt size. An open end 38 of the bushing chamber 36 located opposite the torque arm 32 forms the location for the rotating bushing 30.

Figure 5:
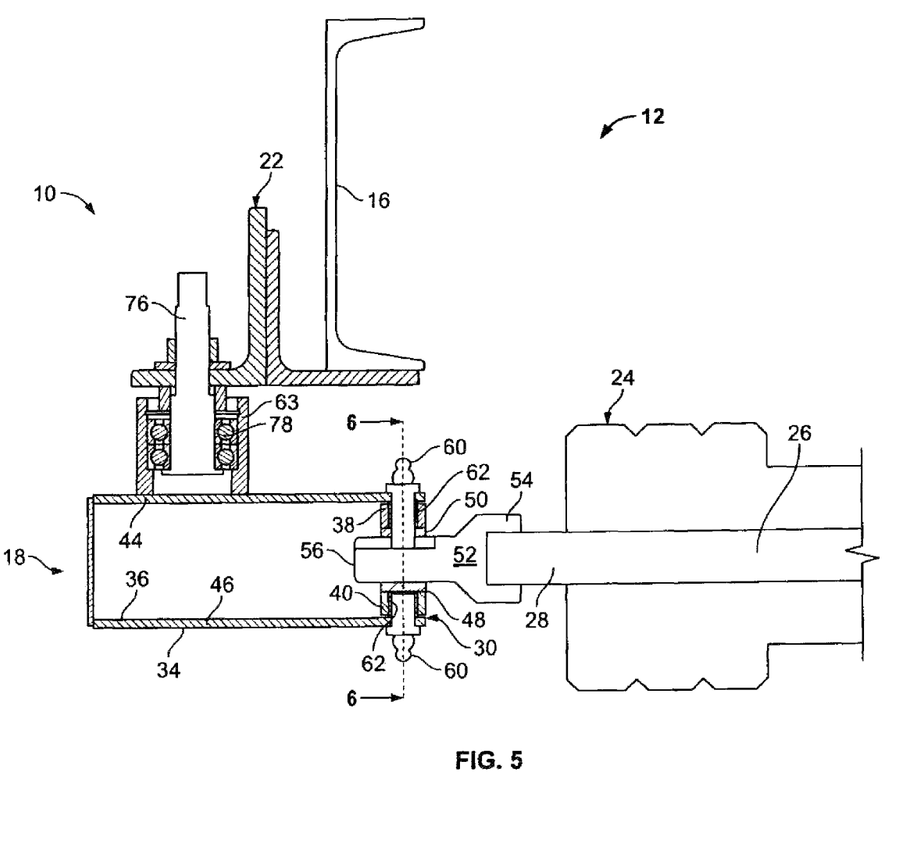
FIG. 5 is a vertical section taken along the line 5-5 of FIG. 4 and in the direction indicated generally.
Figure 6:
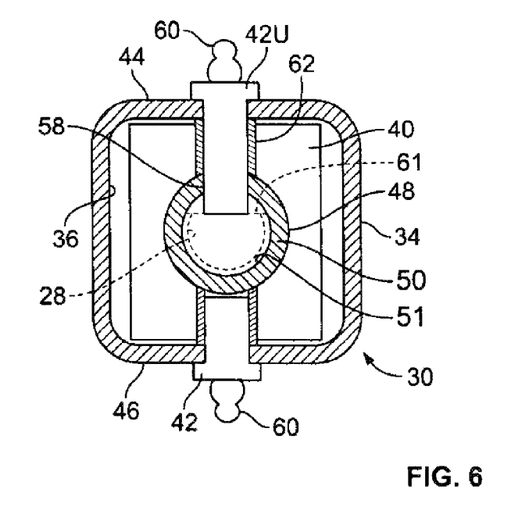
FIG. 6 is a vertical section taken along the line 6-6 of FIG. 5 and in the direction indicated generally.
Figure 7:
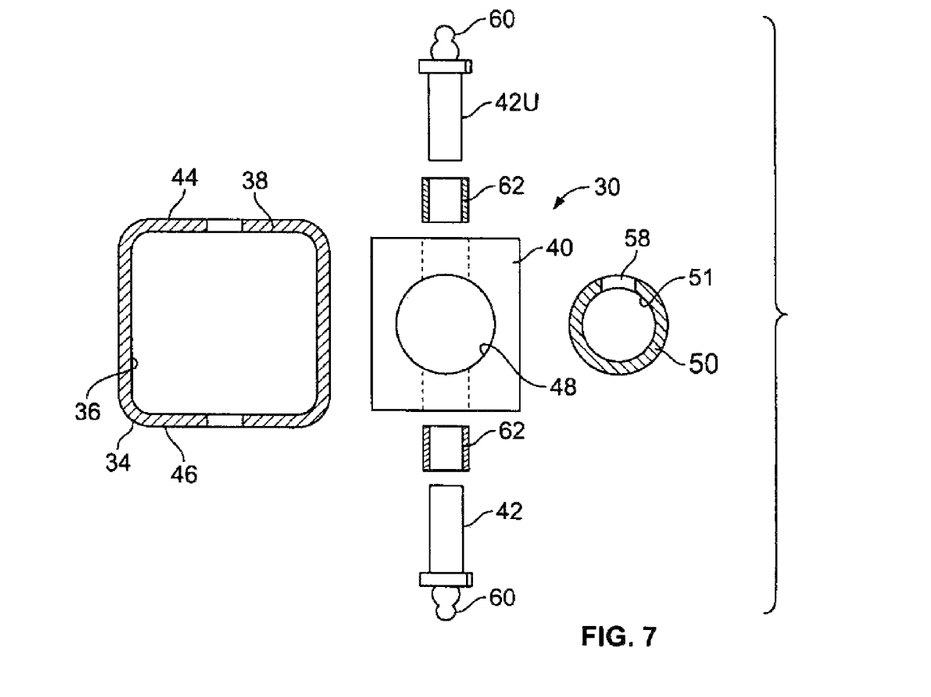
FIG. 7 is an exploded elevational view of the present alignment system.

Referring now to FIGS. 5-7, the rotating bushing 30 includes a block 40 dimensioned to be freely rotatable about a vertical axis defined by pivot pins 42 engaged in upper and lower walls 44, 46 of the bushing housing 34. The block 40 includes a central bore 48 provided with a circular bushing member 50. In the preferred embodiment, a central bore 51 of the bushing member 50 is configured for individually, pivotally and non-rotatably accommodating at least one of the roller shaft ends 28 or an optional shaft adapter 52. As is known in the art, the shaft adapter 52 has a shaft engagement end 54 for receiving the shaft end 28, and an opposite end 56 having the same dimensions as the shaft end for engaging the bushing 30.

It is preferred that the bushing member 50 is an Oil Lite bushing, with an opening 58 at at least one end for receiving one of the pivot pins 42, which are hollow and are each preferably provided with a lubricating fitting 60, such as the conventional Zerk fitting. As such, lubricant such as oil or grease may be injected into the fitting 60 for lubricating the bushing 30 and the shaft end 28. In the preferred embodiment, both pins 42 are provided with lubricating fittings 60. Also, as seen in FIG. 7, one of the pins 42U is provided with longer length so that it extends transversely through the block 40 and the bushing member 50 for engaging a flat spot 61 (FIG. 6 shown in phantom) on the shaft end 28 for preventing rotation of the shaft end relative to the bushing member 50. However, the shaft end 28 still pivots with the block 40 relative to the bushing housing 34 about a pivot axis defined by the pins 42.

Another feature of the present system 10 is that the pivot pins 42 are each preferably provided with a tubular pin bushing 62 for facilitating the rotation of the block 40 relative to the bushing housing 34. While the material may vary to suit the situation, the pin bushing 62 is preferably made of the same Oil Lite material as is the bushing member 50. Thus, upon assembly and proper lubrication, the present rotating bushing 30 readily accommodates the full degree of deflection of the shaft 26 having the tracking rollers 24 and the shaft ends 28 to maintain desired belt alignment as will be described below.

Referring now to FIG. 5, each pivot member 18, 20 is mounted on a corresponding support bracket 22 by a pivot housing 63. The support bracket 22 is in turn mounted to the conveyor frame 16, either on the working flight or the return flight of the conveyor belt 14. In FIGS. 1-3 and 5, the support bracket 22 is shown mounted to the conveyor frame 16 so that the present alignment system 10 is associated with the return flight.

Returning now to FIGS. 2-4, a free end 64 of each torque arm 32 opposite the bushing housing 34 is pivotally attached at a pivot point such as a bolt 66 to a corresponding end 68 of a guide control bar 70 having ends extending laterally past or outside the conveyor frame 16. Attached to the guide control bar 70 are two spaced, freely rotating guide rollers 72 (FIGS. 2 and 4) positioned for periodically engaging corresponding edges 74 of the conveyor belt 14.

The guide or tracking control bar 70 activates the pivoting mechanism provided by the pivoting members 18, 20, through the torque arms 32. Unlike tracking rollers used in combination with conventional conveyor belt applications, the present alignment system 10 provides for the conveyor belt 14 crossing tracking rollers before the belt reaches the guide rollers 72, thereby ensuring that the guide rollers adjust the correct belt path rather than the mistracking path.

In operation, as the belt 14 travels along the conveyor 12, the guide rollers 72 generally follow the lateral movement of the belt, thereby continuously monitoring and controlling the belt alignment and axis. It is contemplated that when the belt 14 is properly aligned, the guide rollers 72 may not be engaged by the belt edges 74. As the belt 14 drifts in one lateral direction, for example the right as seen at the arrow B in FIG. 2, the right guide roller 72R will begin to rotate and also move right on the control bar 70, seen by the arrow B', causing the adjacent pivot member 18 to rotate clockwise as seen in FIG. 2 about its pivot axis defined by a mounting pin 76 (best seen in FIG. 5) as shown by arrow B'''. The mounting pin 76 is provided with a bearing 78 for facilitating relative rotation of the pivot housing 63 connected to the bushing housing 34. Thus, the pivot housing 63 and the bushing housing 34 move together. The guide control bar 70 is thus connected at each end to the shaft end 28 through three pivot points, 42, 76 and 66.

This movement causes the bushing housing 34 to also rotate clockwise, causing the corresponding shaft end 28 to move upward at arrow B'''' as seen in FIG. 2. Such shaft deflection will be accommodated by the bushing 30 in the opposite pivot member 20, which will accommodate the movement of the opposite shaft end 28 in the opposite direction (downward as seen in FIG. 2). In addition, this deflection of the shaft end 28, and the subsequent angled orientation of the tracking rollers 24, will cause the belt 14 to move back to its desired centered position. As the belt 14 moves back to the centered position, the opposite edge 74 may eventually engage the opposite guide roller 72L.

Figure 8:
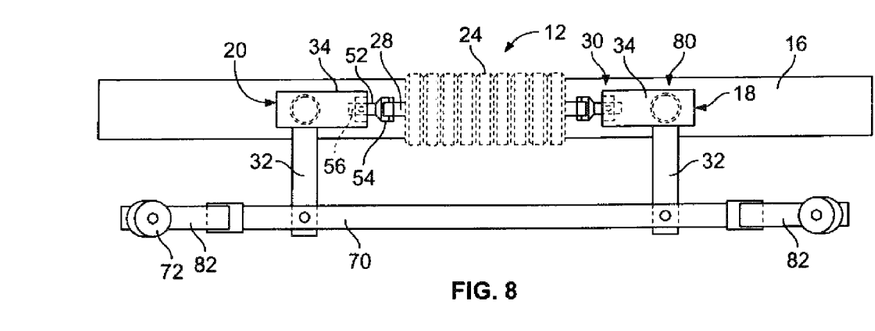
FIG. 8 is a top view of the present alignment system mounted on a working flight of the conveyor belt.

Referring now to FIGS. 8 and 9, an alternate embodiment of the present system 10 is generally designated 80. Components shared with the system 10 are designated with identical reference numbers. The system 80 is mounted on an upper surface of the conveyor frame 16 to be associated with the working flight of the belt 14 (shown in phantom in FIG. 9). Thus, the system 80 is mounted beneath the belt 14. A structural difference of the system 80 is that the guide rollers 72 are mounted on angled extensions 82 which are in turn mounted to the guide control bar 70 so that the rollers are in operational relationship to edges 74 of the belt 14. As is known in the art, the belt 14 is supported in its cupped or troughed shape by angled rollers 84 as well as generally horizontally aligned rollers 86 (FIG. 1).

Thus, the system 10 operates with a series of freely pivotable points 66, 76 and 42. By providing the bushing member 50 in the freely pivotable bushing block 40, the present system 10 provides a greater degree of accommodation of shaft deflection compared to prior art units. Such greater degree of deflection accommodation facilitates conveyor operation and prolongs the operational life of both the alignment system 10 and the conveyor 12.

On the return flight side of the conveyor belt, the support bracket 22 and pivoting members 18, 20 are mounted onto the frame 16, also referred to as a conveyor stringer. This in turn will prevent any build up material from jamming the pivoting members 18, 20 and the tracking rollers 24. It will be appreciated that the present system 10 can be installed in a new conveyor or as a retrofit unit to existing conveyors.

Figure 10:
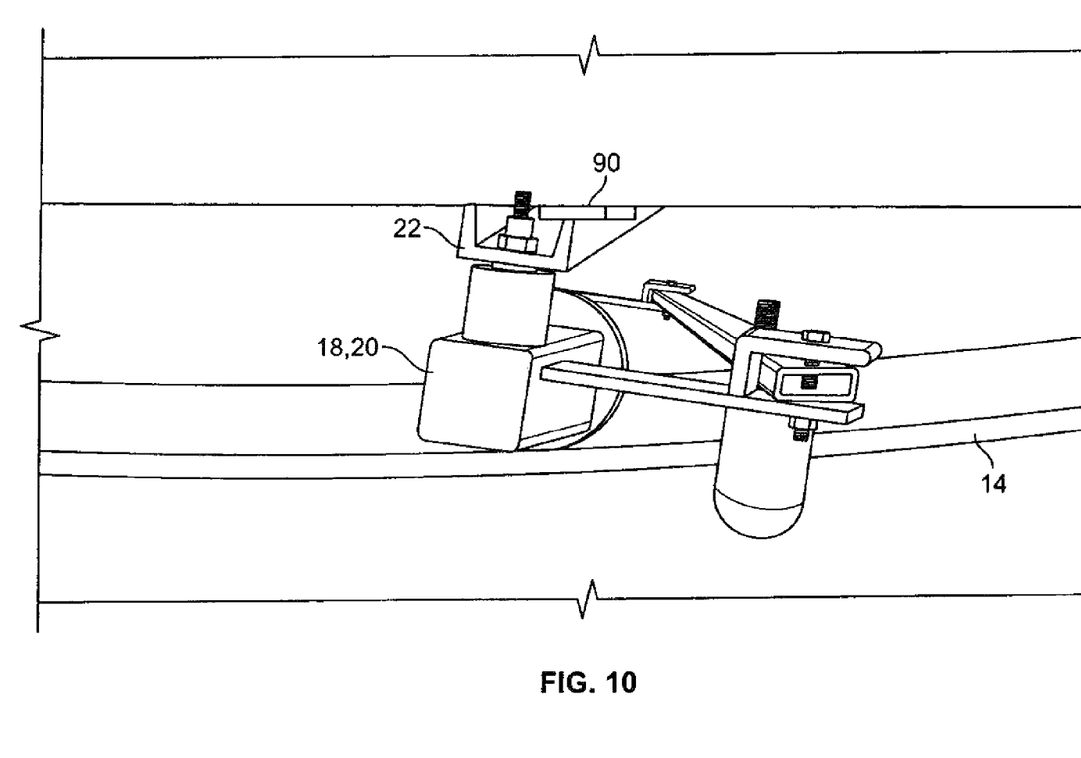
FIG. 10 is a side view of another embodiment of the present alignment system.

Referring now to FIG. 10, another embodiment of the present system 10 includes a spacer 90 mounted to one side of the support bracket 22 to change the angle of the pivot members 18, 20 relative to the conveyor belt 14. The spacer 90 is secured to the support bracket 22 using a suitable fastener, such as a bolt and a washer. It should be appreciated that the spacer 90 may be welded to the support bracket 22 or secured to the support bracket using any suitable fastening device or fastening method. The addition of the spacer 90 to the support bracket 22 vertically deflects the support bracket by the height or thickness of the spacer 90. In the illustrated embodiment, the height of the spacer 90 is 0.5 inches. It should be appreciated that the spacer may be any suitable height or thickness and be any suitable length.

In operation, as the pivot members 18, 20 rotate relative to the belt, the spacer 90 causes one end of the shaft to move downward thereby causing the rollers 24 on that end of the shaft to contact the belt 14 and add tension to that side of the belt. The other end of the shaft moves upward or away from the belt 14 thereby moving the rollers away from the belt to reduce tension on that side of the belt. Adding and reducing the tension on respective sides of the belt 14 assist in moving the belt to the center position.

While a particular embodiment of the present conveyor alignment system with rotary bushing has been shown and described, it will be appreciated by those skilled in the art that changes and modifications may be made thereto without departing from the invention in its broader aspects and as set forth in the following claims.

I claim:

1. An alignment system for a conveyor having a conveyor belt trained over rollers on a conveyor frame, the system comprising:
   pivoting members each mounted on a corresponding support bracket, said pivoting members coupled to tracking rollers mounted on a shaft at corresponding tracking roller shaft ends;
   each said shaft end pivotally and non-rotatably attached to corresponding pivoting members by a rotating bushing mounted in a corresponding one of each of said pivoting members;
   a guide control bar having two ends and being pivotally connected at each said end to a corresponding torque arm connected to said corresponding pivoting member, said bar including guide rollers positioned at both edges of the conveyor belt for lateral control of said belt; and
   a spacer mounted to the support bracket, said spacer having a designated height and deflecting said support bracket by said height so that a first end of said shaft is closer to the a first side of the belt than an opposing, second end of said shaft to increase the tension of said tracking rollers on the first side of the belt and reduce the tension of said tracking rollers on another side of the belt.

2. The alignment system of claim 1 wherein each of said pivoting members includes a housing defining a bushing chamber, and said rotating bushing includes a block rotatable about a vertical axis defined by pivot pins engaged in upper and lower walls of said housing.

3. The alignment system of claim 2 wherein said block is dimensioned to freely rotate within said bushing chamber.

4. The alignment system of claim 2 wherein said block includes a central bore provided with a bushing member.

5. The alignment system of claim 4 wherein said bushing member is configured for individually accommodating at least one of a roller shaft and a shaft adapter.

6. The alignment system of claim 4 wherein at least one of said pins is long enough to project through said bushing member to engage a flat spot on a corresponding one of said shaft ends for preventing rotation of the shaft end in the bushing.

7. The alignment system of claim 1 wherein each of said pivoting members is generally "L"-shaped, including a housing defining a bushing chamber oriented normally to a torque arm.

8. The alignment system according to claim 1 wherein the support brackets are positioned on one of a working flight side or return flight side of the conveyor belt.

9. The alignment system according to claim 8 wherein when the support brackets are positioned on the return flight side of the conveyor belt said belt may ride on one of the top and beneath tracking rollers.

10. The alignment system according to claim 1 wherein said tracking rollers are castellated.

\* \* \* \* \*